April 30, 1957     T. L. FAWICK ET AL     2,790,523
PROTECTIVELY SEALED BRAKE ASSEMBLY
Filed March 5, 1952
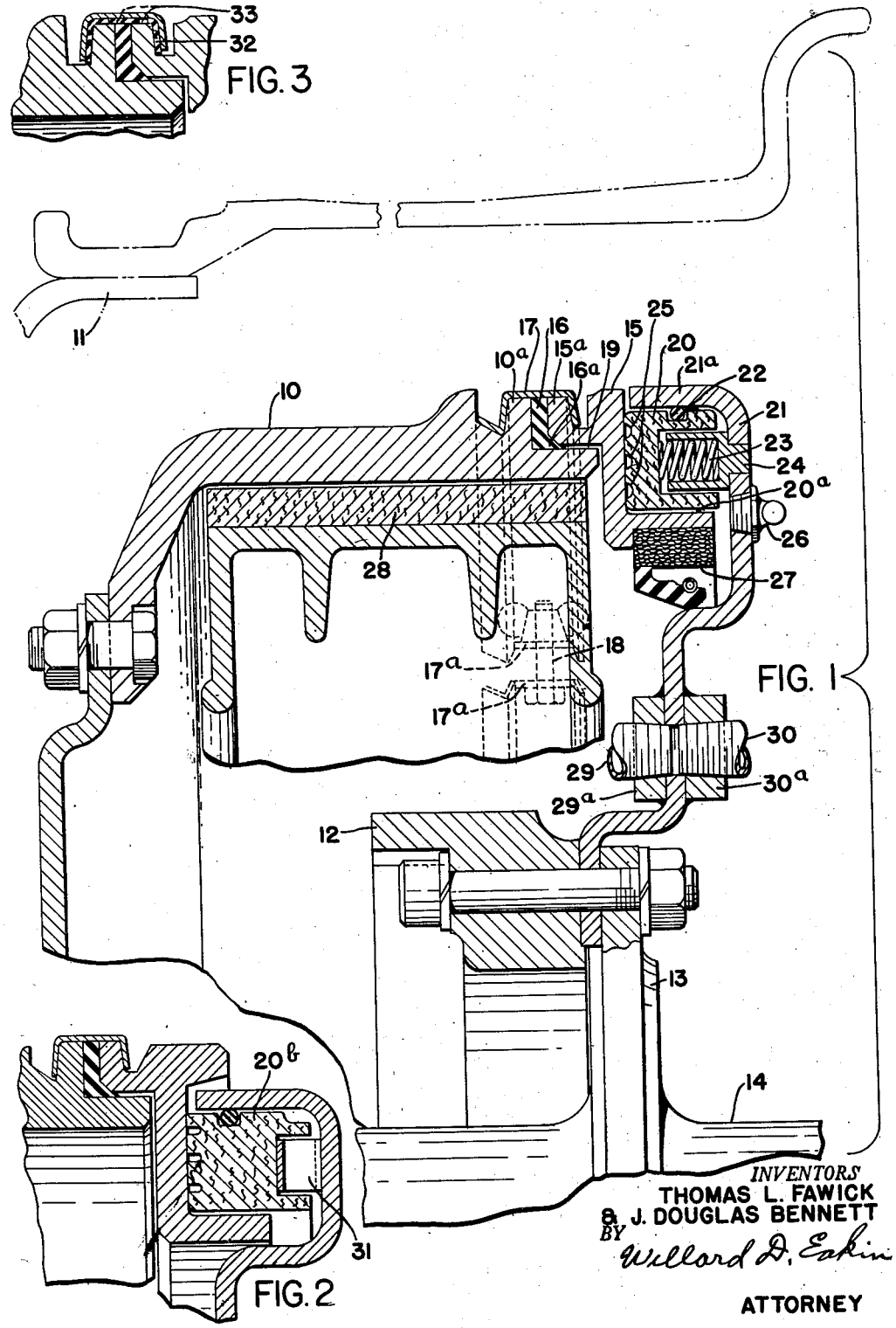
INVENTORS
THOMAS L. FAWICK
& J. DOUGLAS BENNETT
BY
Willard D. Eakin
ATTORNEY

United States Patent Office 2,790,523
Patented Apr. 30, 1957

2,790,523

PROTECTIVELY SEALED BRAKE ASSEMBLY

Thomas L. Fawick, Cleveland, and J Douglas Bennett, Bay Village, Ohio, assignors, by direct and mesne assignments, to Fawick Corporation, a corporation of Michigan Application March 5, 1952, Serial No. 274,882

4 Claims. (Cl. 188—218)

This invention relates to vehicle brakes and particularly to slip-seal closure means for excluding water, mud and other foreign matter from the interior of the brake assembly.

Its object is to provide an improved slip-seal closure means for a vehicle brake and especially to provide a structure such that the sealed condition will be maintained in spite of warping of the brake drum by frictional heat and in spite of such distortion of the brake drum as results from the braking pressure of the shoe or shoes against it.

Of the accompanying drawings:

Fig. 1 is a fragmentary axial section of a brake assembly embodying our invention in its preferred form but with part of the axle housing shown in elevation.

Fig. 2 is a fragmentary axial section, showing a modification.

Fig. 3 is a fragmentary axial section illustrating a further modification.

The brake drum 10 is rigid with and rotates with the vehicle wheel 11. The non-rotating brake hub 12 is rigidly secured to a flange 13 of the axle-housing or axle 14.

To provide a rotary slip-seal surface not rigid with the brake drum 10 and consequently not subject to excessive distortion by distortion of the drum, as the result of application of the brake or in the case of warping of the drum by frictional heat, I mound upon the open end of the drum a rigid sealing ring 15 having connection to the drum only by reason of a rubber gasket 16 interposed between the ring 15 and the drum and held under compression by a channel-shaped, somewhat flexible clamping ring 17, preferably formed of stamped sheet metal and preferably having a transverse split and suitable clamping means, such as a clamping bolt 18 extending through ears 17ª, 17ª bent out from the body of the ring 17, for circumferentially tightening it upon taper flanges 10ª and 15ª formed upon the drum 10 and the ring 15 respectively and embracing the gasket.

The part of the ring 15 adjacent the gasket 16 is of large enough inner diameter to provide a little clearance at 19 between the drum and the ring and preferably the gasket 16 is formed at one side of its inner periphery with a sloping centering flange 16ª fitting against a complemental bevel face formed on the ring 15.

The part of the ring 15 extending away from the drum is of L section for resistance to bending and for avoidance of a large maximum radius, and a part of the L extending toward the axis of rotation has on its outer side a polished annular slip-seal surface to be sealed against by a slip-seal ring 20 formed preferably of a material like brake-lining material but having a high content of graphite for lubrication of the slip-seal surfaces.

The slip-seal ring 20 is mounted within the peripheral flange 21ª of a closure-plate stamping 21, bolted and sealed at its inner periphery to the non-rotating axle-flange 13. The slip-seal ring 20 is sealed to and centered in the flange 21ª by a rubber O-ring or "soft-packing" 22 mounted in a groove formed in the radially outer face of the ring.

A little clearance is provided, at 20ª, between the inner periphery of the slip-seal ring 20 and the ring 15.

The slip-seal ring 20 is constantly held against the slip-seal face of the floating ring 15 by a circumferentially spaced set of compression springs such as the spring 23, each of the springs being mounted in a spring-seat cup member such as the member 24 formed with a tenon fitting in a hole in the closure-plate 21. The slip-seal ring 20 is preferably of channel shape, as shown, for economy of material and to accommodate the springs 23 and their seat members 24 with economy of axial space.

Preferably the slip-seal ring 20 is formed on its slip-seal face with a groove or grooves 25 to divide the surface of the ring 20 into a plurality of individually-sealing annular sealing areas, so that the sealing pressure per square inch of slip-seal contact can be high without a very great total sealing pressure; so that moisture or other foreign matter would have to pass a plurality of such annular sealing areas, and the intervening grooves or groove, in order to get into the brake; and so that there is improved likelihood that at all times there will be one or more of such annular sealing areas effectively sealed, in spite of deformation or even slight wobbling of the drum in relation to the hub.

When the slip-seal ring 20 is self-lubricating, as above described, additional lubrication is not essential, but can be provided, as by mounting a grease fitting 26 in a hole, in the closure-plate 21 and interposing an oil-seal 27, as shown, between the ring 15 and the plate 21.

The brake here contemplated is of the type having a plurality of shoes, such as the shoe 28, hinged upon the brake hub 12 by means not shown and actuated by pressure fluid supplied to suitable devices, not shown, through a conduit, comprising pipes 29, 30 coupled by means of threaded bosses 29ª, 30ª welded to opposite faces of the closure-plate 21.

The structure shown in Fig. 2 corresponds substantially to that shown in Fig. 1 except that for economy and for facility of assembly and disassembly, with closely spaced positions of spring pressure against the slightly deformable ring 20ᵇ, a sinuous annular spring 31 is substituted for the set of springs 23 of Fig. 1 and the oil fitting 26 and oil seal 27 of Fig. 1 are omitted.

The structure shown in Fig. 3 corresponds substantially to that shown in Figs. 1 and 2 except that the stamped-metal clamping ring is provided with a rubber lining 32, permissibly formed with flow-space perforations 33, 33, to make more freely resilient the connection between the floating ring 15 and the brake-drum, by complete rubber insulation of the ring 15 from the drum 10.

Further modifications are possible without departure from the scope of the invention as defined in the appended claims.

We claim:

1. A vehicle brake assembly comprising a brake drum, a brake-hub and brake-shoe assembly and means for closing and sealing an annular space between those two elements, said means comprising a ring resiliently mounted upon and sealed to one of said elements and formed with an annular slip-seal surface of plane form only and having a mean diameter substantially as great as that of the friction surface of the brake drum, and a slip-seal ring mounted upon and sealed to the other of said elements and having an annular slip-seal face mating with an annular middle zone only of the slip-seal face of the first mentioned ring, the assembly including resilient means interposed between the second-mentioned ring and the one of the recited elements upon which it is mounted for yieldingly holding the mating slip-seal faces in sealing engagement with each other, and the mounting of the first-mentioned ring comprising an annular flange on said ring, an annular flange on the one of the recited elements upon which it is mounted, a gasket between the two said flanges, and resilient means holding the two flanges resiliently clamped against the said gasket.

2. An assembly as defined in claim 1, said flanges having taper faces and the last said means comprising a channel strip engaging said taper faces and means for circumferentially tightening it thereon for increasing the clamping pressure against the gasket by radially inward movement of the channel strip on the recited taper faces.

3. An assembly as defined in claim 1, the said gasket being formed with a laterally projecting centering portion for centering the said first mentioned ring in relation to the element upon which it is mounted.

4. An assembly as defined in claim 1, said flanges having taper faces and said means comprising a rubber-lined channel strip engaging said taper faces and means for circumferentially tightening it thereon for increasing the clamping pressure against the gasket by radially inward movement of the channel strip on the recited taper faces.

References Cited in the file of this patent

UNITED STATES PATENTS

| | | |
|---|---|---|
| 1,995,691 | Stough | Mar. 26, 1935 |
| 2,080,669 | Nelson | May 18, 1937 |
| 2,222,654 | Donaldson | Nov. 26, 1940 |
| 2,308,114 | Schjolin | Jan. 12, 1943 |
| 2,426,047 | Payne | Aug. 19, 1947 |
| 2,571,035 | Hastings | Oct. 9, 1951 |

FOREIGN PATENTS

| | | |
|---|---|---|
| 48,670 | France | Feb. 8, 1938 |
| | (Addition to 731,041) | |